United States Patent [19]

Whittington et al.

[11] 4,193,900

[45] Mar. 18, 1980

[54] FIRE CARCASS RESILIENT RUBBER COMPOSITIONS

[75] Inventors: Lawrence E. Whittington, Round Rock, Tex.; Marvin L. Deviney, Jr.; James E. Lewis, both of Worthington, Ohio; Duane K. Chapman, Ashland, Ky.

[73] Assignee: Ashland Oil, Inc., Ashland, Ky.

[21] Appl. No.: 969,501

[22] Filed: Dec. 14, 1978

Related U.S. Application Data

[63] Continuation-in-part of Ser. No. 828,301, Aug. 29, 1977, abandoned, which is a continuation-in-part of Ser. No. 509,172, Sep. 25, 1974, abandoned, which is a continuation-in-part of Ser. No. 342,831, Mar. 19, 1973, abandoned.

[51] Int. Cl.$^2$ .................. B60C 1/00; C08L 9/00; C08L 95/00
[52] U.S. Cl. .................. 260/28.5 B; 152/357 R; 260/745
[58] Field of Search ............ 260/28.5 A, 28.5 B, 260/745; 152/357 R

[56] References Cited

U.S. PATENT DOCUMENTS

| | | | |
|---|---|---|---|
| 2,768,119 | 10/1956 | Nash | 208/45 |
| 2,991,241 | 7/1961 | Renner | 208/22 |
| 3,140,248 | 7/1964 | Bell et al. | 208/42 |
| 3,508,597 | 4/1970 | Iyengar | 152/357 |
| 3,751,389 | 8/1973 | Hotta | 260/28.5 B |

OTHER PUBLICATIONS

Chem. Abst. 66:8640x, 1967.
Chem. Abst. 82:141,328t, 1975.

*Primary Examiner*—Theodore Morris
*Attorney, Agent, or Firm*—Van D. Harrison, Jr.

[57] ABSTRACT

Vulcanizable rubber compounds useful for preparing pneumatic tires in which an unoxidized petroleum pitch serves to replace partially or totally the aromatic extender oil content customarily included in such compounds.

5 Claims, No Drawings

FIRE CARCASS RESILIENT RUBBER COMPOSITIONS

CROSS REFERENCE TO RELATED APPLICATIONS

This is a continuation-in-part of application Ser. No. 828,301 filed Aug. 29, 1977 now abandoned, the latter being a continuation of application Ser. No. 509,172 filed Sept. 25, 1974, now abandoned, which in turn is a continuation of application Ser. No. 342,831 filed Mar. 19, 1973, now adandoned.

BACKGROUND OF THE INVENTION

1. Field of Invention

This invention relates to vulcanizable rubber compounds and the cured products thereof characterized in containing a petroleum pitch as a plasticizing additive.

2. Prior Art

In modern rubber technology, plasticizers in the form of extender oils are widely used in formulating resilient type rubber compositions. These oils, when incorporated into a rubber composition, presumedly lubricate the molecules of rubber so that they slide easily on each other. Consequently, the rubber composition can be mixed and extruded through processing apparatus without rupturing of the individual rubber molecules and consequent degradation of desired rubber properties. U.S. Pat. No. 2,964,083, for example, discloses compositions of synthetic rubber containing preferably liquid or oily plasticizers, reinforced with carbon black and additionally containing the usual additives. The plasticizers disclosed generally are derived from the refining of petroleum and represent petroleum fractions obtained by distillation or extraction before these fractions have been subjected to any sort of decomposition by pyrolysis or other forms of cracking. The types of rubber in which plasticizers or extender oils are used include the styrene-butadiene, polybutadiene, polyisoprene, ethylene-propylene terpolymer and natural rubbers with the styrene-butadiene type predominating.

For practical and economic reasons rubber compounders have continued to increase the concentrations of petroleum extender oils in their rubber formulations, and the result has been improved processing characteristics of the rubber and enhanced mechanical performance of pneumatic tires and other fabricated rubber articles. There have been some indications, however, that the beneficial effects of oil extenders are not permanent. For example, increased wear, decreased adhesion and tread separation accompanying the prolonged service use of tires may result from the migration of diffusion of extender oil from a region of higher concentration to an adjacent region of lower concentration. The oil concentration gradients between different sections in a tire are designed to obtain the optimum balance of elastomer properties in the tire as a complete entity. Studies with laboratory-simulated tires containing radio-active-tagged extender oils have further corroborated the phenomenon of extender oil migration.

SUMMARY OF THE INVENTION

In accordance with the present invention, petroleum pitch is incorporated into a rubber composition as a total or partial replacement of the aromatic extender oil normally included in such compositions. The word "pitch", in this context, accordingly designates an unoxidized petroleum pitch and excludes other types of pitch such as coal tar or oxidized petroleum pitches. The pitch functions primarily as a plasticizer although it imparts other beneficial properties. The pitch advantageously exhibits less tendency to migrate from an area of great concentration to a region of less concentration in a rubber article such as a tire thus reducing the problems from extender oil migration. The compositions of this invention may contain in addition to a requisite amount of sulfur for vulcanization purposes other components ordinarily used in rubber compounding such as carbon black, zinc oxide, stearic acid as well as a curing agent and an oxidation stabilizer.

DETAILED DESCRIPTION OF THE INVENTION

Generally any of the natural or synthetic types of rubber polymers presently used in commercial rubber compounding may be used in our invention. Generally we prefer the styrene-butadiene, polybutadiene, polyisoprene, ethylene-propylene terpolymer and natural rubbers and mixtures of these. A preferred rubber is the styrene-butadiene type. The proportion of synthetic or natural rubber polymer in the final composition will, of course, be determined by the end use of the composition and the amount of carbon black and other enumerated additives included in the composition.

The Pitch

The unoxidized petroleum pitches useful in the practice of this invention are characterized in remaining rigid at temperatures closely approaching their melting points. The preferred procedure for preparing the thermal petroleum pitches uses as starting material, a clarified slurry oil or cycle oil from which substantially all paraffins have been removed in fluid catalytic cracking. Where the fluid catayltic cracking is not sufficiently severe to remove substantially all paraffins from the slurry oil or cycle oil, they may be extracted with furfural. In either case, the resultant starting material is a highly aromatic oil boiling at about 700° to 850° F. This oil is thermally cracked at elevated temperatures and pressures for a time sufficient to produce a thermally cracked petroleum pitch with a softening point of about 150° to about 240° F. although pitches of softening points as low as 100° F. and as high as 350° F. can be produced. The manufacture of unoxidized thermal petroleum pitches is described in U.S. Pat. Nos. 2,768,119 and 3,140,248. Representative of the foregoing pitches useful in the practice of this invention are characterized in terms of their more important physical properties in Table 1 set forth below.

As indicated hereinabove the gist of the present invention resides in the use of the aforementioned pitches as a partial or total replacement of the aromatic extender oils conventionally used for plasticizing purposes in formulating resilient carbon black reinforced rubber products. In this connection, the extender oil is customarily employed in the amount of about 21 to 42 parts by weight per 100 parts of the elastomer component. Accordingly, useful amounts of pitch range from 10 to 100% of the amount of extender oil that would normally be used in a particular formulation.

Table I

| Test | Test Method | Pitch A | Pitch B | Pitch C | Pitch D | Pitch E |
|---|---|---|---|---|---|---|
| Softening Point, °F., R & B | ASTM D-2398 | 173 | 174 | 168.5 | 166 | 240 |
| Density, G/cc | Mettler | 1.192 | 1.205 | 1.160 | 1.178 | 1.216 |
| Mod. Con. Carbon Wt. % | ASTM D-2416 | 37.8 | 43.8 | 39.6 | 36.9 | 51 |
| Flash, COC, °F. | ASTM D-92 | 540 | 495 | 545 | 535 | 595 |
| Pen. 100/5/77 | ASTM D-5 | 0 | 0 | 0 | 0 | 0[2] |
| Pen. 200/60/115 | ASTM D-5 | 128 | 47 | 208 | — | — |
| Pen. 50/60/15 | ASTM D-5 | 40 | 37 | 68 | — | — |
| Sulfur, Wt. % | ASTM D-1552 | 2.73 | 1.47 | 2.01 | 0.95 | 1.5 |
| Benzene Ins., Wt. % | ASTM D-2317 | 0.80 | 11.7 | 1.9 | 2.3 | 5.0 |
| Quinoline Insol., Wt. % | ASTM D-2318 | 0.11 | [1] | Nil | Nil | Nil |
| Viscosity, CPS 350 | Brookfield | 40 | 70 | 45 | 32 | — |
| (#2 Spindle, 325 | Brookfield | 60 | 110 | 82.5 | 65 | — |
| 30 RPM) 300 | Brookfield | 140 | 230 | 165 | 135 | — |

[1] Quality of solids content too great to permit filtering
[2] Penetration, 200/60/77

METHOD OF MIXING

Ordinarily rubber is supplied to the manufacturer in bales of coagulated latex commonly known as masterbatch. The masterbatch material may have some plasticiser oil already present in it as well as other components. The technique of adding the petroleum pitch of our composition is similar to the technique now used in incorporating into the masterbatch additives such as carbon black, zinc oxide, silica, antioxidants, and curing agents. The masterbatch material is placed in a mixing machine such as a roll mill, Gordon plasticator or a Banbury mixer. To the masterbatch is added the desired amount of petroleum pitch which preferably is in a flaked or other particulated form. Other desired additives such as carbon black are added and the combined materials are mixed for a predetermined period in the mixing apparatus. The resulting composition is then processed further through extruding apparatus or other fabricating machines.

EXAMPLE

In laboratory tests rubber samples of standard compositions were made using both styrene-butadiene rubber and a blend of styrene and butadiene rubbers. Standard additives including carbon black, zinc oxide, oil, stearic acid, accelerators, and antioxidants were also added in a constant ratio by weight of additive to rubber. The composition of the standard rubber samples is presented in Table II. To the standard compositions of Table II various weight percent of two commercial extender oils and two thermal petroleum pitches were added.

In Table II and in the other data following the designation SBR indicates a rubber consisting completely of styrene-butadiene polymer, and the designation SBR/BR indicates a blend of 50 percent styrene-butadiene polymer and 40 percent styrene-butadiene polymer.

Table II

Standard Rubber Composition

|  | Parts by weight per 100 parts by weight of polymer |
|---|---|
| Polymer (SBR or SBR/BR) | 100 |
| Carbon Black | 50 |
| Zinc Oxide | 3 |
| Oil | 42 |
| Stearic Acid | 1.5 |
| Sulfur | 1.75* |
| Accelerators | 1.13 |
|   "Santocure" 0.85 | |
|   "DPG" 0.25 | |
| Antioxidant ("Flexzone" 7L) | 0.50 |
| | 199.88 |

*The sulfur can be varied up to 3 parts per 100 parts of the elastomer

To each of these standard samples various weight percentages of two commercial extender oils and two thermal petroleum pitches having softening points of 170° F. and 240° F. were added. The two commerical extender oils designated A and B in the following data were ASTM Type 102 and ASTM Type 101 respectively. Each of the compositions thus formulated was submitted to a series of tests as indicated below in Table III. These tests are standard throughout the rubber compounding industry and so are not described further as to the procedures involved. Test results are as shown in Table III.

Table III

| Standard Rubber Composition Tested | SBR | | | | SBR/BR (60/40) | | | | | | | |
|---|---|---|---|---|---|---|---|---|---|---|---|---|
| Type of carbon black used in standard composition | N-660 | | | | N-330 | | | | | | | |
| Type of commercial extender or pitch added | A | B | Pitch 170 | Pitch 240 | A | B | Pitch 170 | Pitch 240 | A | B | Pitch 170 | Pitch 240 |
| Percent by weight of composition of extender or pitch added | 16 | | | | 21 | | | | 16 | | | |
| Cure | 90%* × 1.2 at 320° F. | | | | 90%* × 1.2 at 305° F. | | | | | | | |
| Modulus (Load in psi to produce 300% elongation) | 580 | 590 | 680 | 630 | 390 | 380 | 520 | 900 | 650 | 600 | 680 | 980 |
| Tensile strength, psi | 2460 | 2590 | 2710 | 2420 | 2200 | 2630 | 2880 | 2800 | 2380 | 3030 | 3100 | 3200 |
| Percent elongation at breaking load | 860 | 890 | 920 | 790 | 860 | 940 | 1000+ | 820 | 630 | 830 | 880 | |
| Hardness (Shore A Durometer) | 48 | 51 | 55 | 60 | 46 | 47 | 56 | 63 | 50 | 52 | 58 | |
| Firestone Running Temperature, °F. | 217 | 222 | 249 | 264 | 216 | 230 | 274 | 306 | 210 | 226 | 250 | |
| Mooney, 4ML, 212° F. | 28 | 32 | 43 | 52 | 25 | 27 | 44 | 66 | 32 | 36 | 51 | |
| Rebound, percent (Goodyear) | 59.5 | 55.5 | 56.4 | 56.4 | 59.5 | 55.9 | 51.0 | 57.4 | 61.0 | 57.4 | 54.7 | |
| Standard Rubber Composition Tested | | | | | SBR/BR (60/40) | | | | | | | |

Table III-continued

| Type of carbon black used in standard composition | N-330 | | | | N-660 | | | |
|---|---|---|---|---|---|---|---|---|
| Type of commercial extender or pitch added | A | B | Pitch 170 | Pitch 240 | A | B | Pitch 170 | Pitch 240 |
| Percent by weight of composition of extender or pitch added | | | 10 | | | | 16 | |
| Cure | | | | 90%* × 1.2 at 305° F. | | | | |
| Modulus (Load in psi to produce 300% elongation) | 1000 | 1020 | 910 | 1000 | 520 | 590 | 760 | 950 |
| Tensile strength, psi | 2900 | 3130 | 3400 | 3390 | 1790 | 2200 | 2220 | 2420 |
| Percent elongation at breaking load | 590 | 640 | 780 | 720 | 700 | 820 | 810 | 800 |
| Hardness (Shore A Durometer) | 58 | 59 | 61 | 63 | 50 | 51 | 56 | 62 |
| Firestone Running Temperature, °F. | 211 | 226 | 244 | 251 | 186 | 202 | 227 | 240 |
| Mooney, 4ML, 212° F. | 43 | 49 | 59 | 66 | 28 | 33 | 46 | 57 |
| Rebound, percent (Goodyear) | 61.5 | 60 | 57.9 | 51.0 | 65.7 | 63.6 | 64.1 | 62.0 |
| Standard Rubber Composition Tested | SBR | | | | | | | |
| Type of carbon black used in standard composition | N-330 | | | | | | | |
| Type of commercial extender or pitch added | A | B | Pitch 170 | Pitch 240 | A | B | Pitch 170 | Pitch 240 |
| Percent by weight of composition of extender or pitch added | | | 21 | | | | 10 | |
| Cure | | | | 90%* × 1.2 at 320° F. | | | | |
| Modulus (Load in psi to produce 300% elongation) | 440 | 400 | 540 | 810 | 1020 | 1100 | 1120 | 1190 |
| Tensile strength, psi | 2490 | 2740 | 2950 | 3010 | 3200 | 3710 | 3780 | 3550 |
| Percent elongation at breaking load | 730 | 880 | 890 | 820 | 600 | 700 | 720 | 700 |
| Hardness (Shore A Durometer) | 46 | 47 | 52 | 62 | 56 | 59 | 60 | 62 |
| Firestone Running Temperature, °F. | 238 | 251 | 282 | 325 | 245 | 248 | 255 | 264 |
| Mooney, 4ML, 212° F. | 21 | — | — | 56 | 39 | 43 | 53 | 57 |
| Rebound, percent (Goodyear) | 46.9 | 49.6 | 51.5 | 48.7 | 56.4 | 54.4 | 54.9 | 53.5 |

*Montsanto Rheometer Cure

From the data in Table III it is readily apparent that petroleum pitch imparts to rubber compositions the properties necessary to manufactuers of rubber articles, particularly tires. Petroleum pitch maintains and improves the modulus of rubber compositions in comparison to the modulus of rubber compositions containing equivalent amounts of extender oils. The hardness of pitch-rubber compositions is greater than that of rubber compositions containing equivalent amounts of commerical extender oils. This is a particularly unexpected and beneficial result in view of the present practice of incorporating special additives to improve the hardness of rubber compositions. These hardness-enhancing additives are relatively expensive in comparison to other materials used in rubber compounding. Conversely petroleum pitch affords an inexpensive means of enhancing hardness. The presently used hardness-enhancing additives often have the adverse effect of decreasing the tensile strength and elongation properties of rubber compositions. The tensile strength and elongation properties of the petroleum pitch-rubber compositions of our invention in contrast show improved tensile strength and elongation.

It will be noted from the data in Table III that rebound values also are not adversely affected by incorporating petroleum pitch. This is another unexpected result since normally the addition of a highly aromatic material such as petroleum pitch would be expected to depress rebound values. Hardness does not vary appreciably with small changes in pitch concentration whereas similar variarions in concentrations of the presently used extender oils does notably decrease hardness.

The Mooney values of petroleum pitch-rubber compositions are increased more in comparison to the Mooney values of rubber compositions containing equivalent concentrations of present-day commercial extender oils. This property enables the rubber compounder to utilize a rubber polymer having a lower original Mooney value than is now possible in formulating a rubber composition having a desired higher Mooney value.

We claim:

1. In a pneumatic tire carcass or tread-grade rubber compound consisting essentially of a homogenous admixture of (a) an elastomer selected from the group consisting of a styrene-butadiene copolymer, polybutadiene, polyisoprene, an ethylene propylene terpolymer, natural rubber and mixtures thereof; (b) a reinforcing amount of carbon black; (c) an aromatic extender oil in the amount of about 21–42 parts by weight per 100 parts of said elastomer; (d) zinc oxide; (3) stearic acid; (f) sulfur in an amount of not in excess of about 3 parts by weight per 100 parts of said elastomer; and (g) effective amounts of a cure accelerator and an oxidation stabilizer; the improvement of including within the compound as a total or partial replacement of said extender oil component an unoxidized thermal petroleum pitch having a softening point between about 100° and 240° F.

2. The improvement in accordance with claim 1 wherein said pitch has a softening point between about 170° and 240° F.

3. The improvement in accordance with claim 2 wherein said pitch has a softening point of about 170° F.

4. The improvement in accordance with claim 2 wherein said pitch has a softening point of about 240° F.

5. The heat-cured product of the compound in accordance with the improvement of claim 1.

* * * * *